(12) United States Patent
Mercado et al.

(10) Patent No.: US 9,269,212 B2
(45) Date of Patent: Feb. 23, 2016

(54) REMOVABLE MASS STORAGE DEVICE IN A WAGERING GAME MACHINE

(75) Inventors: Victor Mercado, Berwyn, IL (US);
Craig J. Sylla, Round Lake, IL (US);
Stephen A. Canterbury, Antioch, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 1534 days.

(21) Appl. No.: 11/419,322

(22) Filed: May 19, 2006

(65) Prior Publication Data
US 2006/0287109 A1 Dec. 21, 2006

Related U.S. Application Data

(60) Provisional application No. 60/682,449, filed on May 19, 2005.

(51) Int. Cl.
| G06F 17/00 | (2006.01) |
| G06F 19/00 | (2011.01) |
| G07F 17/32 | (2006.01) |
| G06F 13/40 | (2006.01) |

(52) U.S. Cl.
CPC ............ *G07F 17/32* (2013.01); *G07F 17/3202* (2013.01); *G07F 17/323* (2013.01); *G07F 17/3216* (2013.01); *G07F 17/3223* (2013.01); *G07F 17/3225* (2013.01); *G07F 17/3241* (2013.01); *G06F 13/4081* (2013.01)

(58) Field of Classification Search
CPC .............. G06F 1/3225; G06F 13/4081; G07F 17/3216; G07F 17/3223; G07F 17/3225; G07F 17/3241

USPC ................................ 463/43; 710/301, 302
See application file for complete search history.

(56) References Cited

U.S. PATENT DOCUMENTS

| 5,758,101 | A | * | 5/1998 | Pemberton | .................... 710/302 |
| 6,311,976 | B1 | * | 11/2001 | Yoseloff et al. | ............ 273/138.2 |
| 6,338,107 | B1 | * | 1/2002 | Neal | ................... G06F 13/4018 |
| | | | | | 710/302 |
| 6,355,991 | B1 | * | 3/2002 | Goff et al. | ...................... 307/140 |
| 6,420,972 | B1 | * | 7/2002 | Loose | ......................... 340/545.1 |
| 6,556,952 | B1 | * | 4/2003 | Magro | .......................... 702/183 |
| 7,047,338 | B1 | * | 5/2006 | Nguyen | .............. G07F 17/3202 |
| | | | | | 463/42 |
| 2002/0073340 | A1 | * | 6/2002 | Mambakkam et al. | ........ 713/202 |
| 2003/0110319 | A1 | * | 6/2003 | Kim et al. | .......................... 710/1 |
| 2004/0198494 | A1 | * | 10/2004 | Nguyen et al. | ................... 463/42 |
| 2005/0086433 | A1 | * | 4/2005 | Okaue et al. | .................... 711/115 |
| 2006/0153026 | A1 | * | 7/2006 | Blacquiere | ............ G06F 3/0605 |
| | | | | | 369/47.1 |
| 2007/0180164 | A1 | * | 8/2007 | Southerland | .................... 710/62 |

\* cited by examiner

*Primary Examiner* — Steven J Hylinski
(74) *Attorney, Agent, or Firm* — Nixon Peabody LLP (57) ABSTRACT

A computerized wagering game system includes a gaming module comprising a processor and gaming code which is operable when executed on the processor to present a wagering game on which monetary value can be wagered. The system also comprises an interface to receive a nonvolatile storage device, which is operable to mount and unmount one or more hot pluggable mass storage devices. In a further embodiment, the interface is operable to prohibit write caching data to be written to the nonvolatile storage device, and to restrict mounting nonvolatile storage devices to authorized users.

21 Claims, 4 Drawing Sheets

REMOVABLE MASS STORAGE DEVICE IN A WAGERING GAME MACHINE

RELATED APPLICATIONS

This application claims priority under 35 U.S.C. 119(e) from U.S. Provisional Application Ser. No. 60/682,449 filed May 19, 2005, which application is incorporated herein by reference.

FIELD OF THE INVENTION

The invention relates generally to computerized wagering game machines, and more specifically to removable mass storage devices in computerized wagering game machines.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2006, WMS Gaming, Inc.

BACKGROUND

Computerized wagering games have largely replaced traditional mechanical wagering game machines such as slot machines, and are rapidly being adopted to implement computerized versions of games that are traditionally played live such as poker and blackjack. These computerized games provide many benefits to the game owner and to the gambler, including greater reliability than can be achieved with a mechanical game or human dealer, more variety, sound, and animation in presentation of a game, and a lower overall cost of production and management.

The elements of computerized wagering game systems are in many ways the same as the elements in the mechanical and table game counterparts in that they must be fair, they must provide sufficient feedback to the game player to make the game fun to play, and they must meet a variety of gaming regulations to ensure that both the machine owner and gamer are honest and fairly treated in implementing the game. Further, they must provide a gaming experience that is at least as attractive as the older mechanical gaming machine experience to the gamer, to ensure success in a competitive gaming market.

Computerized wagering games do not rely on the dealer or other game players to facilitate game play and to provide an entertaining game playing environment, but rely upon the presentation of the game and environment generated by the wagering game machine itself. Incorporation of audio and video features into wagering games to present the wagering game, to provide help, and to enhance the environment presented are therefore important elements in the attractiveness and commercial success of a computerized wagering game system. Presentation of the wagering game often includes animation, video, and three-dimensional graphics, in addition to sophisticated multichannel audio music and sound effects.

Player preferences regarding such things as multimedia preferences, progress in a game, and amount of money wagered can be stored in a nonvolatile storage device such as a USB flash drive that the user can carry and insert in a wagering game system before or during play. Such devices can also be used to carry multimedia or new code to a wagering game system, such as to update the executable game code or change the video or sound presented during a wagering game. But because a user or game technician can freely insert or remove such a nonvolatile storage device at any time, there is a risk that it will be removed while data transfer to or from the nonvolatile storage device is in process or incomplete.

It is therefore desired that use of a removable or hot-pluggable nonvolatile storage device be managed in a wagering game system.

SUMMARY

One example embodiment of the invention comprises a computerized wagering game system includes a gaming module comprising a processor and gaming code which is operable when executed on the processor to present a wagering game on which monetary value can be wagered. The system also comprises an interface to receive a nonvolatile storage device, which is operable to mount and unmount one or more hot pluggable mass storage devices. In a further embodiment, the interface is operable to prohibit write caching data to be written to the nonvolatile storage device, and to restrict mounting nonvolatile storage devices to authorized users.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the scope or extent of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

One example embodiment of the invention comprises a computerized wagering game system includes a gaming module comprising a processor and gaming code which is operable when executed on the processor to present a wagering game on which monetary value can be wagered. The system also comprises an interface to receive a nonvolatile storage device, which is operable to mount and unmount one or more hot pluggable mass storage devices. In a further embodiment, the interface is operable to prohibit write caching data to be written to the nonvolatile storage device, and to restrict mounting nonvolatile storage devices to authorized users.

Figure 1:
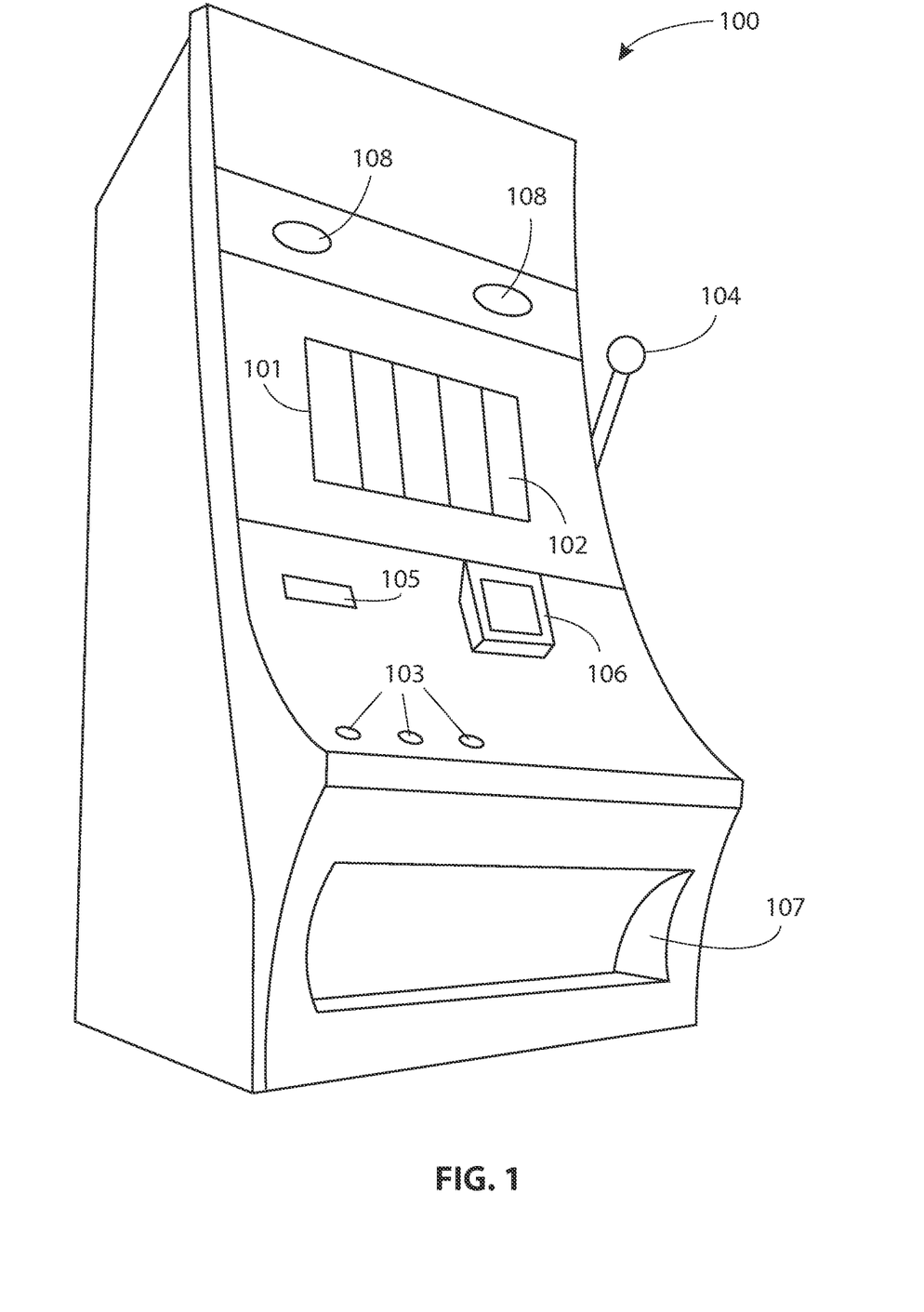
FIG. 1 shows a computerized wagering game machine, as may be used to practice some example embodiments of the invention.

FIG. 1 illustrates a computerized wagering game machine, as may be used to practice some embodiments of the present invention. The computerized gaming system shown generally at 100 is a video wagering game system, which displays information for at least one wagering game upon which monetary value can be wagered on video display 101. Video display 101 is in various embodiments a CRT display, a plasma display, an LCD display, a surface conducting electron emitter display, or any other type of display suitable for displaying electronically provided display information. Alternate embodiments of the invention will have other game indicators, such as mechanical reels instead of the video graphics reels shown at 102 that comprise a part of a video slot machine wagering game.

A wagering game is implemented using software within the wagering game system, such as through instructions stored on a machine-readable medium such as a hard disk drive or nonvolatile memory. In some further example embodiments, some or all of the software stored in the wagering game machine is encrypted or is verified using a hash algorithm or encryption algorithm to ensure its authenticity and to verify that it has not been altered. For example, in one embodiment the wagering game software is loaded from nonvolatile memory in a compact flash card, and a hash value is calculated or a digital signature is derived to confirm that the data stored on the compact flash card has not been altered. The wagering game implemented via the loaded software takes various forms in different wagering game machines, including such well-known wagering games as reel slots, video poker, blackjack, craps, roulette, or hold 'em games. The wagering game is played and controlled with inputs such as various buttons 103 or via a touchscreen overlay to video screen 101. In some alternate examples, other devices such as pull arm 104 used to initiate reel spin in this reel slot machine example are employed to provide other input interfaces to the game player.

Monetary value is typically wagered on the outcome of the games, such as with tokens, coins, bills, or cards that hold monetary value. The wagered value is conveyed to the machine through a changer 105 or a secure user identification module interface 106, and winnings are returned via the returned value card or through the coin tray 107. Sound is also provided through speakers 108, typically including audio indicators of game play, such as reel spins, awarding of credits (bang-ups), and environmental or other sound effects or music to provide entertainment consistent with a theme of the computerized wagering game. The wagering game system takes other forms in other embodiments, such as a portable wireless wagering game system, or a user-provided system such as a wireless computer, phone, or PDA that is operable to present a game conducted on a server. In some further embodiments, the wagering game machine is coupled to a network, and is operable to use its network connection to receive wagering game data, track players and monetary value associated with a player, and to perform other such functions.

The user identification module interface 106 comprises in some embodiments an interface operable to receive a removable nonvolatile storage device, such as a USB flash drive. Devices that can be connected while a computerized system is turned on and in operation are sometimes called hot-pluggable, which means that they can be connected and disconnected while power and other signals in the interface are "hot" or active. The USB interface is designed to handle a variety of hot pluggable devices, and can receive other hot pluggable nonvolatile memory such as a compactflash or other nonvolatile memory card via a USB interface.

Data stored on the user identification module includes in some embodiments data that uniquely identifies the game player to the wagering game system, such as a user name or player ID code. This can be used to store information related to the game player's activities and preferences in the wagering game system or on another system in the wagering game system's network, or on the user identification module itself. The user identification module can be used to store information such a player rating, data relating to a monetary value wagered or an amount of time the user has played wagering games, and player preferences such as volume settings or rate of play preference. In further embodiments, the user identity module is also operable to store data such as multimedia files, such as a particular player's favorite music or awarded media from previous wagering game sessions.

But, hot plugging and unplugging nonvolatile storage, whether in the form of a user identity module or other storage such as a software or multimedia update for the wagering game system, can be dangerous. If the wagering game system is in the middle of reading or writing data to the nonvolatile storage while it is unplugged, the data file can be incomplete and its size and contents not properly recorded in a file allocation table or other directory structure. Further, many operating systems and other devices don't write data to a storage device every time there's a request to transfer data, but cache or buffer the writes in memory and send the data to storage in larger blocks at less frequent intervals for more efficient operation. If data destined for a removable nonvolatile storage device is cached when the storage device is removed, it isn't written to the device and the data on the device is out of date or missing. This generally isn't a problem with hard disk drives, where the operating system can write all the data in a write cache or buffer before shutting down a computer, but is more problematic for hot pluggable devices intended to be inserted and removed from computerized systems during operation.

One solution to this problem is to provide a software-driven unmount function for the device. Such a system would require the user to perform some function such as entering a command or actuating a button or touchscreen object to cause the operating system to logically unmount the device, emptying any cached data and ending data transfer with the device. Another solution is to prevent the wagering game system from caching data written to the removable storage device, so that when the device is removed there are no writes cached for the removed device. With this solution, there is still a chance that the device will be removed while data is actively being written, but because data writes to nonvolatile memory occur very quickly, the risk of losing data is significantly reduced.

In a further embodiment, the removable nonvolatile storage medium has an indicator such as a light emitting diode (LED) that changes state to indicate write activity. For example, a LED on the removable nonvolatile storage device lights up upon connection with a computerized wagering game system, and flashes off and on while data is being transferred. The user can therefore observe whether the nonvolatile storage device is mounted and accessible to the operating system of the wagering game machine, and can see whether the device is actively transferring data before removing it.

In another embodiment, the removable nonvolatile storage device is located behind a door, such as within the locked game cabinet or within a user-accessible door. In further embodiments, multiple removable nonvolatile storage interfaces are present in different locations within the system, each operable to mount and unmount a nonvolatile storage volume.

For example, one embodiment features a nonvolatile storage interface inside the logic box within a lockable computerized wagering game system to be used for updating game or operating system code, features another nonvolatile storage interface in the game cabinet area used for updating multimedia files, and features a user nonvolatile storage interface used for storing user-related data. The user nonvolatile storage volume mounts only when a door protecting the user interface is closed, and unmounts via operating system software triggered by a mechanical switch when the door is opened. Similarly, nonvolatile storage devices in the game cabinet area are unmounted when the game cabinet is open, but devices in the logic box within the game cabinet remain mounted until the logic box door is opened, at which point a door switch triggers the operating system to unmount the logic box removable nonvolatile storage volume.

The nonvolatile storage device includes security features in some embodiments, such as biometric identifiers, encryption, or other such security measures designed to ensure that only authorized users are able to access the data on the storage device. The biometric identifier, such as a camera or fingerprint reader, is a part of either the removable storage device or of the wagering game system in various embodiments. A variety of biometric identification or authentication methods are possible, including fingerprint identification, retina scanning, face identification, and other such biometric measurements.

Fingerprint evaluation is among the oldest and most widely accepted methods of identification, and is therefore relatively likely to be easily understood and accepted by wagering game players. Fingerprints vary from person to person, even between supposed identical twins, and so make unique identification of a user possible based on the fingerprint alone. Fingerprint scanning typically involves detection and characterization of the relative positions of various fingerprint characteristics, including starting and ending points of ridges and ridge defects or branch points. The physical location and type of these various characteristics are recorded, and are matched against a previous record of the same fingerprint for authentication. For this reason, storage of the fingerprint record is desirably secure, to prevent forging a fingerprint by drawing or modeling a fingerprint based on data from a lost or stolen secure user identification module.

In some embodiments, the gaming machine's access to data stored in a removable storage device is restricted at least in part until the game player's identity is authenticated. In other embodiments, the nonvolatile storage device is encoded with an identifier such as a serial number that identifies the game player to the wagering game machine, and the fingerprint reader or other biometric measurement element simply reports fingerprint metrics and a serial number to the wagering game machine, which matches the scanned fingerprint to the serial number and authenticates the game player's identity such as via a network server.

The nonvolatile storage module also therefore has varying degrees of processing power in various embodiments of the invention. For example, the fingerprint scanner in a removable nonvolatile storage device in some embodiments analyzes the fingerprint to authenticate the game player, and decrypts stored data, making it available to the computerized wagering game machine via the interface. In other embodiments, the removable nonvolatile storage device simply comprises a biometric authentication device and some unique identifier indicating the owner of the device. A limited amount of memory or processing power is included in some further embodiments, such as where a removable nonvolatile storage device is able to analyze biometric information and provide an identifier indicating the identity of the game player, but not to process large amounts of data.

Because some such embodiments of the removable nonvolatile storage device are able to secure the memory such that it can be accessed by a wagering game machine only after authentication of the user, such a device is a practical and secure way to store monetary value or credits for the wagering game player. Value may be either encoded directly into the removable nonvolatile storage device, or in alternate embodiments is stored within a networked server and is accessed once a gamer's identification has been confirmed via the biometric identifier or other security feature of the removable nonvolatile storage device. Similar systems are employed in further embodiments for tracking and managing a game player's promotional points for having played or wagered a certain amount, for storing preferences such as volume levels and other game settings, and for storing game progress data to preserve a persistent state or to record a gamer's progress or position in a progressive game.

In another example removable nonvolatile storage device, an optical scanner is used in various embodiments for eye recognition, such as for retina or iris recognition, or for face or other recognition of the game player. Eye-based biometrics are presently among the most secure methods of biometric identification, and so provide a relatively secure means of authenticating a game player. The iris is the colored portion of the eye, behind the cornea. The colored ring of textured tissue that forms the iris has a unique structure, which is relatively stable throughout a person's life. Typical iris identification systems work by scanning the iris by scanning concentric rings around the pupil, and by recording the variations in color or texture.

Falsifying an eye is difficult because a photograph or other representation of an eye will not refract light the way a normal eye will. Further, natural pupillary motion can be observed, and can further assist in rejection of models or photographs. In more extreme cases, the iris also is among the fastest body parts to decay after removal from a human body, making separation of a subject's eye for identification purposes impractical.

Similarly, the retina of an eye is made of a unique pattern of blood vessels on the back of an eye, and is optically visible through the pupil. Scanning the retina for identity authentication typically involves projecting a beam of light into a relatively still eye, which makes retinal scanning in some respects less desirable than other methods, such as iris, fingerprint, or face recognition. Still other embodiments will use other biometric identifiers, such as camera or other sensor recognition of other body parts, or voice recognition via a microphone.

The interface between the removable nonvolatile storage device and the wagering game system is in some further embodiments secured, so that any electronic devices monitoring the interface or placed between the sec removable nonvolatile storage device and the wagering game machine will not be able to receive useful data. Establishing security over an electronic interface is well-known in the art, and takes various forms, including exchanging a session key with a key exchange protocol. In such a system, a session key to be used for that communications session only is generated by either the removable nonvolatile storage device or by the computerized wagering game machine. The session key is then securely exchanged through one or more exchanges of encrypted data between the wagering game machine and the removable nonvolatile storage device. Such systems prevent intercepting or altering the data exchanged via the interfaces, and prevents impersonation of a secure user identification module by simply recording and replaying its interaction with the wagering game machine.

Figure 2:
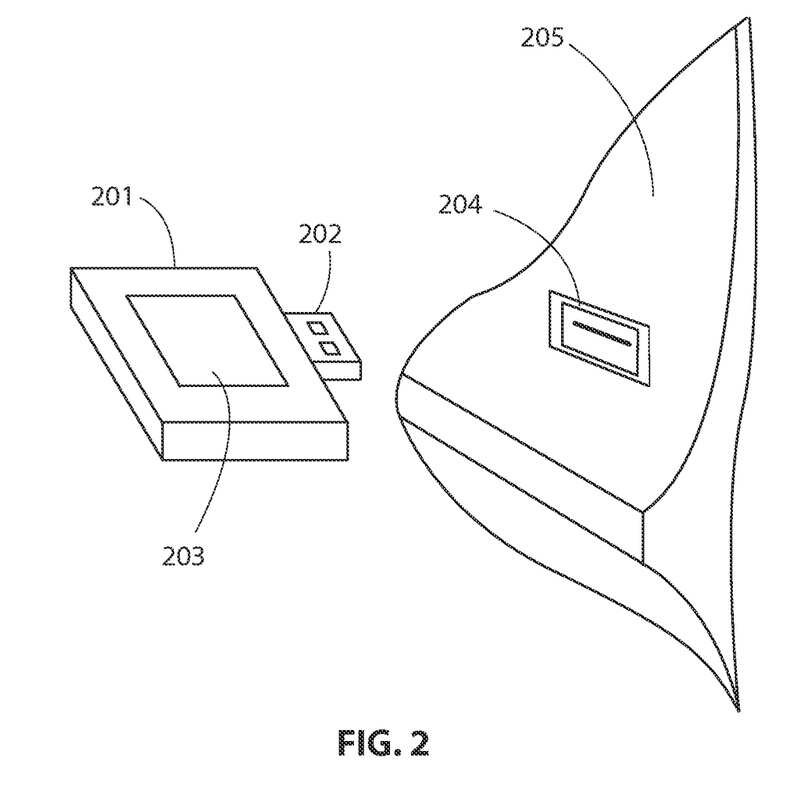
FIG. 2 shows a removable nonvolatile storage device featuring a biometric identification feature, consistent with some example embodiments of the present invention.

FIG. 2 shows an example of such a removable nonvolatile storage device and a wagering game system having a USB interface and biometric security feature. The removable nonvolatile storage device at 201 includes a USB male plug at 202, and a fingerprint reader at 203. The male USB plug 202 is operable to mechanically and electrically connect the removable nonvolatile storage device to a USB socket 204 on a computerized wagering game system 205. In alternate embodiments, different physical interfaces are used to prevent users from casually misusing their removable nonvolatile storage devices by interfacing them with personal computers or other unintended computerized systems.

In operation, the user is authenticated to the nonvolatile storage device and to the wagering game system 205 by operation of the fingerprint reader 203 once the removable nonvolatile storage device 201 is properly interfaced with the computerized wagering game system 205. Data is exchanged between the nonvolatile storage device and the wagering game system, such as explained in greater detail in the flowcharts of FIGS. 3 and 4.

Figure 3:
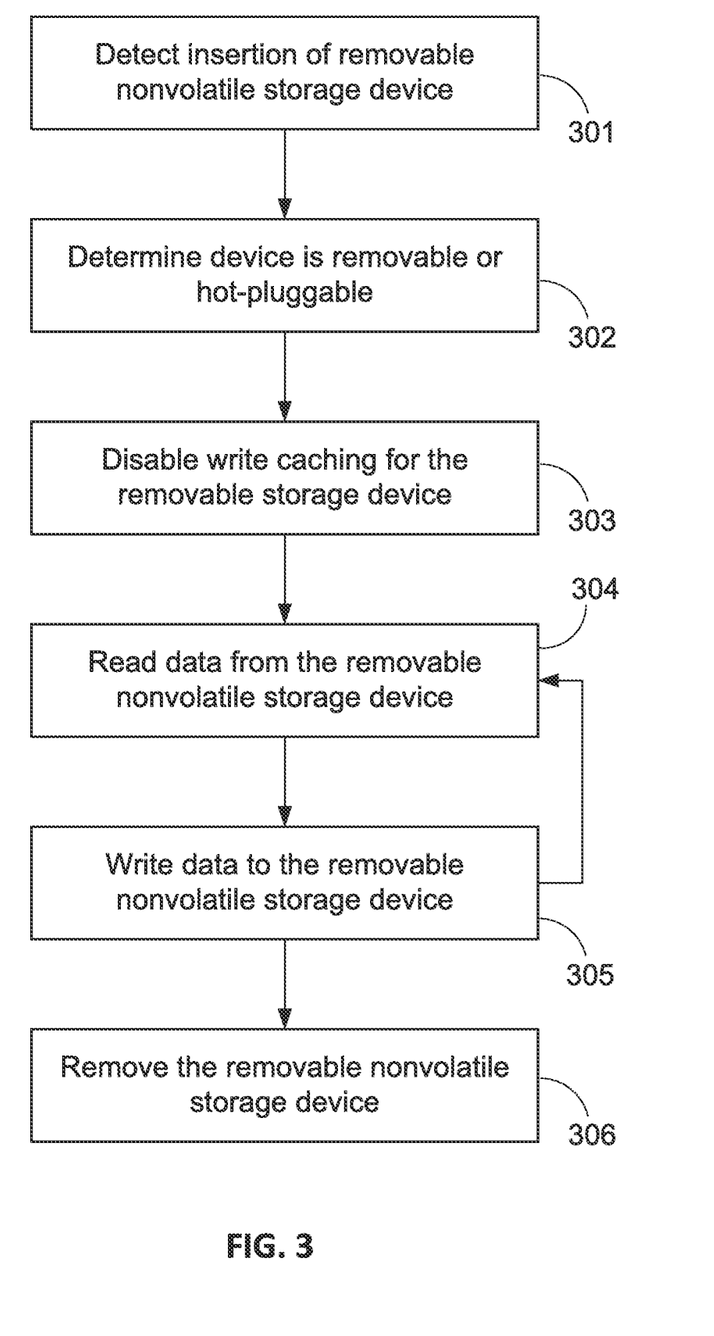
FIG. 3 is a flowchart illustrating a method of managing a removable nonvolatile storage device in a wagering game system to prevent data loss due to write caching, consistent with some example embodiments of the present invention.

FIG. 3 is a flowchart showing a method of operating a wagering game machine to restrict write caching to a removable nonvolatile storage device, consistent with an example embodiment of the invention. The removable nonvolatile storage device is inserted into an interface in the wagering game system at 301. At 302, the inserted device is identified as a removable or hot-pluggable nonvolatile storage device that can be removed while the wagering game system is in operation. To protect the nonvolatile storage device's data integrity in the event of removal while the system is operational, write caching to the removable nonvolatile storage device is disabled at 303. In some embodiments, disabling write caching still allows write-through caching, in which data is both written to the storage device and stored in a cache such as in memory. This is permitted because every write operation still results in a write directly to the removable nonvolatile storage device, but the wagering game machine can continue to perform some functions more quickly by also maintaining a local copy of the data in its regular memory, which operates faster than the nonvolatile storage device.

Data is read from the removable nonvolatile storage device at 304, and is written to the removable nonvolatile storage device at 305. Various patterns of writes and reads occur during the course of operation of the wagering game system, such as reading and updating player preferences, accumulated winnings, progress through a particular wagering game, accumulated "comp" credits, and other such data. Because none of this data is cached in memory only, the nonvolatile storage device can be removed with relative safety at 306.

Figure 4:
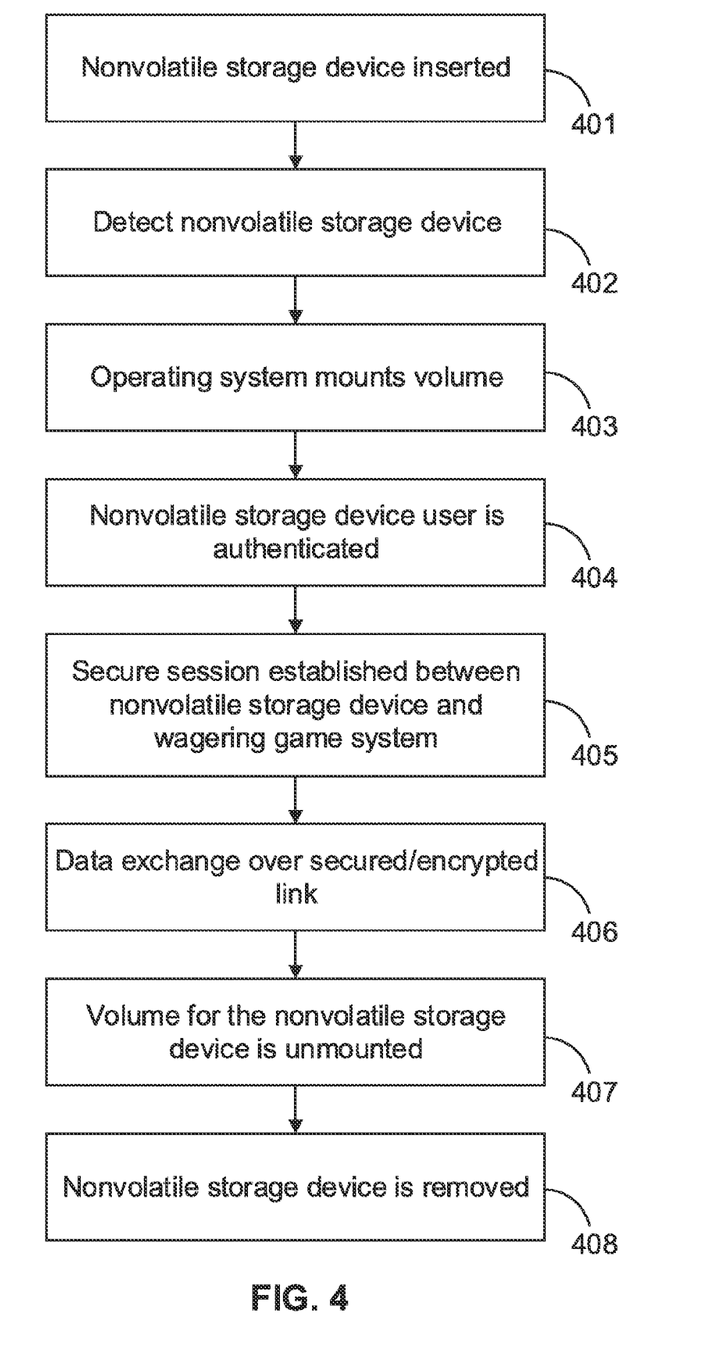
FIG. 4 is a flowchart illustrating a method of managing a removable nonvolatile storage device in a wagering game including unmounting a secure volume before removal, consistent with some example embodiments of the present invention.

In another example embodiment shown in the flowchart of FIG. 4, the removable nonvolatile storage device is removed only after being unmounted through a user or software action. At 401, the removable nonvolatile storage device is inserted into the computerized wagering game system. The wagering game system detects the presence of the removable nonvolatile storage device at 402, and the operating system mounts the volume at 403. Mounting the volume is the process by which the operating system of the wagering game system recognizes the nonvolatile storage device as a read/write storage medium, and assigns it a logical identity by which it can be addressed. The storage device user is authenticated at 404, such as by use of a biometric identifier as discussed earlier, or by use of a password or other authentication method.

At 405, a secure session is established between the removable nonvolatile storage device and the wagering game system. The secure session is established as explained earlier by a method such as key exchange, so that data can be exchanged over the communications link between the removable nonvolatile storage device and the computerized wagering game system at 406. Establishing a secure communications session at 405, authenticating the nonvolatile storage device user at 404, and mounting the logical volume in the operating system at 403 are performed in other orders in various other embodiments, such as where a secure session is established and a user is authenticated before the volume is mounted.

When the device is to be removed, the volume is unmounted at 407 within the operating system of the wagering game device, so no further writes or reads take place. Unmounting the volume also flushes or empties any write cache that may be used, so that all data transfers are complete. The removable nonvolatile storage device can then be removed at 408. Unmounting the removable nonvolatile storage device in one example comprises a user-driven function, where a user action such as a touchscreen button actuation initiates unmounting the volume. In other embodiments, the volume is unmounted based on a software event, such as on completion of a wagering game session or event.

The examples presented here show how a removable nonvolatile storage device can be managed in a computerized wagering game system environment to provide greater storage and communication integrity. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A computerized wagering game system, comprising:
 a cabinet having a lockable door and a door switch internal to the cabinet, the door switch being configured to open in response to the lockable door being opened and to close in response to the lockable door being closed;
 a gaming module comprising a processor and gaming code which is configured when executed on the processor to present a wagering game on which monetary value can be wagered; and
 a nonvolatile storage device interface configured to mount and unmount one or more hot pluggable mass storage devices based on the position of the door switch such that the one or more mass storage devices can only be mounted when the switch is actuated and an operating system of the computerized wagering game system recognizes the one or more hot pluggable mass storage devices as a read/write storage medium and assigning it as a logical identity by which it can be addressed, and where the one or more mass storage devices is unmounted when the switch is deactuated and all pending data transfers have been completed and further writes to or reads from the one or more hot pluggable mass storage devices are disallowed.

2. The computerized wagering game system of claim 1, wherein the one or more hot pluggable mass storage devices comprise at least one of a serial advanced technology attachment (SATA) hard disk drive, a SATA flash drive, or a USB flash drive.

3. The computerized wagering game system of claim 1, wherein the nonvolatile storage device interface comprises software operable to prevent write buffering data to be written to the mass storage device, or wherein the nonvolatile storage device interface comprises a software component operable to detect the presence of removable mass storage devices and to disable write buffering to detected removable mass storage devices.

4. The computerized wagering game system of claim 1, wherein the nonvolatile storage device interface comprises software-based unmount function that is operable to unmount the mass storage device.

5. The computerized wagering game system of claim 1, wherein the nonvolatile storage device interface is further operable to restrict mounting a removable mass storage device to authorized users.

6. The computerized wagering game system of claim 5, wherein restricting mounting a removable mass storage device to authorized users comprises using one or more biometric security functions to restrict hot plugging mass storage devices to authorized users.

7. The computerized wagering system of claim 1, wherein the nonvolatile storage device interface and the door switch are located inside a cabinet of the computerized wagering game system such that the door switch is actuated in response to a lockable door to the cabinet being opened and is deactuated in response to the lockable door being closed.

8. A non-transitory machine-readable medium with instructions stored thereon, the instructions when executed operable to cause a computerized wagering game system to:
present using a processor a wagering game on which monetary value can be wagered; and
mount and unmount one or more hot pluggable mass storage devices based on the position of a switch internal to a cabinet of the wagering game system such that the mass storage device can only be mounted when the switch is actuated and can only be unmounted when the switch is deactuated, the switch comprising a door switch that opens in response to a lockable door to the cabinet being opened and closes in response to the lockable door being closed, wherein mounting the one or more hot pluggable mass storage devices includes an operating system of the computerized wagering game system recognizing the one or more hot pluggable mass storage devices as a read/write storage medium and assigning it as a logical identity by which it can be addressed, and wherein unmounting the one or more hot pluggable mass storage devices completes all pending data transfers and disallows further writes to or reads from the one or more hot pluggable mass storage devices.

9. The machine-readable medium of claim 8, wherein mounting and unmounting one or more hot pluggable mass storage devices comprises mounting and unmounting at least one of a serial advanced technology attachment (SATA) hard disk drive, a SATA flash drive, or a USB flash drive.

10. The machine-readable medium of claim 8, wherein the instructions are further operable when executed to prevent write buffering data to be written to the mass storage device.

11. The machine-readable medium of claim 8, wherein the instructions are further operable when executed to provide a software unmount function that is operable to unmount the mass storage device.

12. The machine-readable medium of claim 8, wherein the instructions when executed are further operable when executed to detect the presence of removable mass storage devices, and further operable to disable write buffering to detected removable mass storage devices while the detected removable mass storage devices remain mounted.

13. The machine-readable medium of claim 12, wherein the instructions when executed are further operable when executed to allow write-through caching on the detected removable mass storage devices.

14. The machine-readable medium of claim 8, wherein mounting a removable mass storage device is restricted to authorized users.

15. The machine-readable medium of claim 14, wherein restricting mounting a removable mass storage device to authorized users comprises using one or more biometric security functions to restrict hot plugging mass storage devices to authorized users, and wherein the removable mass storage device has a limited amount of memory or processing power to analyze one or more biometric features and to provide an identifier indicating an identity of at least one of the authorized users.

16. A method of managing removable mass storage devices in a computerized wagering game system, the computerized gaming system including a gaming machine used for playing at least one wagering game, the gaming machine including a cabinet, a video display device, and an electronic input interface, the cabinet constructed to house components associated with the wagering game, the video display device and the electronic input interface being coupled to the cabinet, the method comprising:
presenting, using software in the computerized wagering game system, the wagering game on which monetary value can be wagered;
unmounting, by a processor, one or more hot pluggable mass storage devices when a door switch internal to the cabinet of the wagering game system is deactuated and only after the one or more hot pluggable mass storage devices completes all pending data transfers and disallows further writes to or reads from the one or more hot pluggable mass storage devices, the door switch opening in response to a lockable door to the cabinet being opened and closing in response to the lockable door being closed; and
mounting, by the processor, the one or more hot pluggable mass storage devices only when the door switch is actuated, the mounting including recognizing the one or more hot pluggable mass storage devices as a read/write storage medium and assigning it a logical identity by which it can be addressed.

17. The method of managing removable mass storage devices in a computerized wagering game system of claim 16, further comprising mounting one or more hot-pluggable mass storage devices only when the switch is actuated.

18. The method of managing removable mass storage devices in a computerized wagering game system of claim 16, wherein the hot-pluggable mass storage devices comprise at least one of a serial advanced technology attachment (SATA) hard disk drive, a SATA flash drive, or a USB flash drive.

19. The method of managing removable mass storage devices in a computerized wagering game system of claim 16, further comprising preventing write buffering data to be written to the mass storage device.

20. The method of managing removable mass storage devices in a computerized wagering game system of claim 16, wherein unmounting one or more hot pluggable mass storage devices comprises execution of a software unmount function that is operable to unmount the mass storage device.

21. The method of managing removable mass storage devices in a computerized wagering game system of claim 16, further comprising restricting mounting a removable mass storage device such that only authorized users can mount a removable mass storage device.

* * * * *